United States Patent Office 2,761,870
Patented Sept. 4, 1956

2,761,870

EPOXY ESTERS OF POLYCARBOXYLIC ACIDS

George B. Payne and Curtis W. Smith, Berkeley, Calif., assignors to Shell Development Company, New York, N. Y., a corporation of Delaware No Drawing. Application September 22, 1954,
Serial No. 457,788

13 Claims. (Cl. 260—348)

This invention relates to a new class of epoxy compounds and to their preparation. More particularly, the invention relates to new epoxy esters of polycarboxylic acids and to valuable derivatives prepared therefrom.

Specifically, the invention provides new and particularly useful polyfunctional esters of alcohols having at least one epoxy group, i. e., a

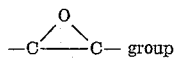

in an internal open-chain portion of the molecule preferably not more than 12 carbon atoms removed from an OH group, and polycarboxylic acids, said

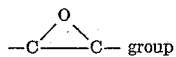

remaining intact in the ester molecule. These new epoxy esters are preferably prepared by contacting a corresponding ester having an ethylenic group in place of the epoxy group with a peroxidizing agent, such as peracetic acid. The invention further provides valuable derivatives prepared from these novel esters, and particularly certain hydroxy amino derivatives obtained by reacting the esters with amines.

It is an object of the invention to provide a new class of polyfunctional epoxy compounds. It is a further object to provide a new class of epoxy esters of polycarboxylic acids and a method for their preparation. It is a further object to provide a new class of epoxy esters of polycarboxylic acids that are resistant to polymerization by amines. It is a further object to provide epoxy esters that may be used to prepare monomeric hydroxy amino esters. It is a further object to provide new hydroxy amino esters which are very valuable in preparing new polyester-polyamide type polymers. It is a further object to provide new epoxy esters of polycarboxylic acids which, while they are inert to amine polymerization, are easily polymerized by amine-anhydride combinations. It is a further object to provide new epoxy esters of polycarboxylic acids which are superior stabilizing and plasticizing agents for halogen-containing polymers. It is another object to provide epoxy esters which may be used to increase the molecular weight of polyamines.

It has now been discovered that these and other objects may be accomplished in part by the novel polyfunctional esters of the present invention comprising esters of alcohols having at least one epoxy group in an internal open-chain portion of the molecule preferably not more than 12 carbon atoms removed from an OH group, and polycarboxylic acids, said epoxy group remaining intact in the ester molecule. It has been found that the unique structural features of these esters endow the products with many new and unobvious properties which make them of particular value in industry. It has been found, for example, that these particular esters differ from other polyepoxy esters in that their epoxy groups are surprisingly inert to polymerization and do not set up to solid resins when treated with materials such as amines. Instead, the polymerizing agents merely add to the epoxy group to form new derivatives. Polyfunctional amines having at least one —NH group, for example, add to the epoxy groups to form new hydroxy amino esters which are very useful in the preparation of polymers as polyester-amides. In addition, the new epoxy esters may be used as linking agents in joining polymers having amine groups so as to increase their molecular weight.

The above-described novel esters have also been found to be good flexibilizing agents for many polymers, and particularly those containing nitrogen or halogen as they have good compatibility therewith and maintain flexibility over a long period of time. The novel esters also act as improved stabilizing agents for materials having acid-forming elements, such as sulfate, phosphate and nitrate radicals and halogen atoms, as the olefin-$SO_2$ rubbers and fibers, and polymers which tend to release hydrogen sulfide, as well as vinyl halide polymers, as they endow the compositions with prolonged stability to discoloration by heat and light.

In addition, it has been found that while the above esters are inert to conventional polymerizing agents, such as the above-noted amines, they react unexpectedly in the presence of a combination of an anhydride and amine to form very hard flexible polymers which are useful in the formation of pottings and castings.

The epoxy alcohols, esters of which are provided by the present invention, comprise the alcohols having at least one epoxy group, i. e., a

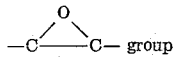

in an internal open-chain portion of the molecule preferably not more than 12 carbon atoms removed from an OH group. Preferred members of this group comprise the aliphatic open-chain monohydric alcohols possessing from 1 to 2 internal epoxy groups and not more than 20 carbon atoms. Examples of these alcohols include, among others, 2,3-epoxybutanol, 2,3-epoxyhexanol, 2,3-epoxydecanol, 2,3-epoxytetradecanol, 4,5-epoxyhexanol, 4,5-epoxyoctanol, 5,6-epoxydecanol, 5,6-epoxydodecanol, 3,4 - diethyl - 6,7 - epoxytetradecanol, 3,4-diisopropyl-6,7-epoxydodecanol, 3,4-epoxyoctadecanol, 8,9-epoxydodecanol, 8,9-epoxyoctadecanol, 8,9-epoxyeicosanol, 4,5,7,8-diepoxytetradecanol, 2,3,5,6-diepoxydodecanol, 2,3,5,6-diepoxytetradecanol, 4 - ethyl - 6,7 - epoxyeicosanol and 10,11-epoxyoctadecanol.

Particularly preferred epoxy alcohols are the epoxyalkanols and diepoxyalkanols containing no more than 18 carbon atoms and having the epoxy group or groups in an internal position no more than 10 carbon atoms removed from the terminal OH group, such as, for example, 2,3-epoxybutanol, 3,4-epoxypentanol, 3,4-epoxyoctadecanol, 3,4,6,8-diepoxydodecanol, 8,9 - epoxyhexadecanol, 4-butyl-6,7-epoxydecanol, 4-isobutyl-5,6-epoxyoctanol and 4,5-epoxyheptanol.

The polycarboxylic acids, esters of which are provided by the present invention, comprise the organic polycarboxylic acids possessing two or more carboxyl groups. These acids may be saturated, unsaturated, aliphatic, cycloaliphatic aromatic or heterocyclic. Examples of these acids include, among others, malonic acid, oxalic acid, adipic acid, suberic acid, azelaic acid, succinic acid, butylsuccinic acid, octadecylsuccinic acid, dodecylsuccinic acid, dodecylmalonic acid, maleic acid, fumaric acid, glutaconic, tricarballylic, aconitic, itaconic, phthalic, isophthalic, 1,8-naphthalenic acid, tetrahydrophthalic, hexahydrophthalic, 3 - methoxyhexahydrophthalic, 3,5 - dimethylhexahydrophthalic, allylmalonic 4-cyclohexene-1,3-dicarboxylic acid, 3-hexyl-4-cyclohexene-1,2-dicarboxylic acid, 3-butyl-1,4-cyclohexadiene-1,2-dicarboxylic acid, 3-methyl-3,5-cyclohexadiene-1,2-dicarboxylic acid, eicosenylsuccinic acid, dimerized linoleic acid, 6-eicosenedioic-1,20, terephthalic, diphenyldicarboxylic, 1,4-dicyclohexanedicarboxylic, hydromuconic, trimellitic acids.

Preferred polycarboxylic acids comprise the aliphatic and cycloaliphatic dicarboxylic acids containing no more than 20 carbon atoms and the aromatic and alkyl-substituted aromatic dicarboxylic acids containing no more than 15 carbon atoms, such as, for example, maleic acid, adipic acid, glutaconic acid, succinic acid, pimelic acid, azelaic acid, octadecanedioic acid, eicosanedioic acid, phthalic acid, heptylphthalic acid, hexahydrophthalic acid, 3-cyclohexane-1,4-dicarboxylic acid and the like. Coming under special consideration are the alkenedioic acids, alkanedioic acids, cycloalkanedioic acids and cycloalkenedioic acids containing no more than 12 carbon atoms.

The epoxy esters of the present invention are the esters obtained by esterifying any one or more of the above-described epoxy alcohols with any of the above-described polycarboxylic acids.

Examples of the novel esters of the invention include, among others, di(2,3-epoxybutyl) adipate, di(2,3-epoxybutyl) oxalate, di(2,3-epoxyhexyl) succinate, di(3,4-epoxyoctyl) maleate, di(2,3-epoxybutyl) pimelate, di-(2,3-epoxybutyl) phthalate, di(2,3-epoxyoctyl) tetrahydrophthalate, di(4,5-epoxydodecyl) maleate, di(2,3-epoxybutyl) terephthalate, di(5,6-epoxytetradecyl) diphenyldicarboxylate, di(4,5,7,8-diepoxytetradecyl) maleate, di(2,3-epoxybutyl) itaconate, di(2,3-epoxybutyl) glutaconate, di(2,3-epoxybutyl) azeleate, di(5,6-epoxyoctyl) cyclohexane-1,3-dicarboxylate, di(2,3-epoxybutyl) trimellitate and di(4,5,8,9-diepoxyoctadecyl) malonate.

Preferred esters are those of the above-described preferred epoxy alcohols as the epoxyalkanols and diepoxyalkanols and the above-noted preferred polycarboxylic acids such as, for example, di(2,3-epoxybutyl) succinate, di(2-epoxyoctyl) oxalate, di(2,3-epoxyhexyl) pimelate, di(2,3-epoxyoctyl) adipate, di(2,3-epoxybutyl) maleate, di(2,3-epoxypentyl) fumarate, di(2,3-epoxybutyl) terephthalate, di(3,4-epoxyoctyl) itaconate, and di(3,4-epoxyhexyl) octylphthalate.

The above-described esters may be obtained by any suitable method. They may be prepared, for example, by reacting any one of the above-described epoxy-substituted alcohols and polycarboxylic acids or anhydrides, or they may be prepared by first esterifying an unsaturated alcohol corresponding to the epoxy alcohol with the polycarboxylic acid or anhydride and then epoxidizing the resulting ester.

As to this latter method of preparation, the unsaturated alcohols used in preparing the esters are those that have at least one ethylenic group in an internal open-chain portion of the molecule preferably not more than 12 carbon atoms removed from the OH groups, such as for example, crotyl alcohol, 3-hexenol, 4-octenol, 4-heptenol, 3-methyl-5-dodecenol, 2-tetradecenol, 3,7-decadienol, 8,11-octadecadienol, 6,12-eicosadienol and the like. The polycarboxylic acids or anhydrides used in the esterification of these alcohols include those described above for esterification of the epoxy alcohols themselves.

The esterification of the epoxy alcohols and the polycarboxylic acids or anhydrides or the esterification of the unsaturated alcohols and the polycarboxylic acids or anhydrides is preferably accomplished by heating the alcohol and acid or anhydride together and removing the water of esterification preferably as fast as it is formed in the reaction mixture.

Catalysts may be used in the direct esterification process if desired, but their presence is not essential to the success of the process. Suitable catalysts include p-toluenesulfonic acid, sulfuric acid, formic acid, monosodium sulfate, aluminum sulfate, and the like. Such catalysts are generally employed in amounts varying from about 0.1% to 5% by weight.

The amount of the alcohol and acid employed will vary over a considerable range. Preferably the acid or anhydride is reacted with at least an equivalent amount of the alcohol. As used herein, equivalent amount refers to that amount of alcohol needed to furnish a hydroxyl group for every carboxyl group to be esterified. Preferably the acid or anhydride and alcohol are combined in equivalent ratios varying from 1:1 to 1:2.

The esterification may be accomplished in the presence or absence of solvents or diluents. In case the solvents or diluents are desired, inert organic materials, such as benzene, toluene, cyclohexanone, and xylene are generally preferred.

The temperature employed during the esterification may vary over a wide range depending upon the type of reactants and catalysts to be employed. In most cases, the temperature will range between about 40° C. to 100° C. with a preferred range being between 50° C. to 80° C. Atmospheric, superatmospheric or subatmospheric pressures may be used as desired.

The separation of the esters formed in the reaction may be accomplished by any suitable means, such as extraction, distillation, fractional precipitation, and the like.

Preparation of the esters by the above method is illustrated by the following experiments showing the preparation of dicrotyl adipate and dicrotyl oxalate which may be subsequently treated to form di(2,3-epoxybutyl) adipate and di(2,3-epoxybutyl) oxalate.

DICROTYL ADIPATE 146 parts of adipic acid, 360 parts of crotyl alcohol and 5 parts of p-toluenesulfonic acid monohydrate were warmed on a steam bath until the catalyst was dissolved. The mixture was then distilled through a 40-tray Oldershaw column equipped with a phase-separating still head. After no more water separate, the excess crotyl alcohol was taken off. The reaction flask was then cooled and the contents dissolved in 300 parts of ether. The ether solution was washed with 10% potassium carbonate solution and water and dried over anhydrous sodium sulfate. After removal of ether on the steam bath the residue was Claisen distilled. There was obtained 204 parts of dicrotyl adipate, D. P. 135–45° C. (0.2 mm.; $N_D^{20}$ 1.4610. C found 66.3, theory 66.1: H found 8.7, theory 8.7; Ester value found 0.79 lg./vog. theory 0.79 eq./100 g.

DICROTYL OXALATE

A solution of 126 parts of anhydrous oxalic acid in 360 parts of crotyl alcohol was distilled through a 40 tray Oldershaw column equipped with a phase-separating stillhead as shown above. When the kettle temperature reached 150° C. the distillation was halted and the kettle contents worked up as above. Fractionation through a two foot packed column gave dicrotyl oxalate, B. P. 109–111° C. $N_D^{20}$ 1.4562.

The epoxidation of the unsaturated alcohols to prepare the above-described epoxy alcohols and the epoxidation of the unsaturated esters of the unsaturated alcohols to produce the novel epoxidized esters, may be accomplished by reacting the unsaturated alcohol or unsaturated ester with an epoxidizing agent. Organic peracids, such as performic, peracetic acid, perbenzoic acid, monoperphthalic acid and the like, are preferred agents for this reaction.

The amount of the epoxidizing agent employed will vary over a considerable range depending upon the type of product desired. In general, one should employ at least one mole of the oxidizing agent, such as perbenzoic acid, for every ethylenic group to be epoxidized. Thus to produce epoxidized dicrotyl adipate from dicrotyl adipate, one should react the unsaturated ester with at least two moles of perbenzoic acid. In some cases, it is rather to effect epoxidation of all of the ethylenic groups and if a completely epoxidized product is required, additional epoxidizing agent and/or longer reaction period may be required.

The temperature employed during the epoxidation may vary over a considerable range depending upon the type of reactants and epoxidizing agents selected. It is generally desirable to maintain the temperature between −20° C. to 100° C. Preferred temperatures range from about −10° C. to room temperature, e. g., about 20° C. Atmospheric, superatmospheric, or subatmospheric pressures may be employed as desired.

The epoxidized product obtained by this method may be recovered from the reaction mixture by any convenient means known to the art, such as distillation, extraction, fractional precipitation and the like.

The novel esters of the invention are relatively high boiling liquids to solids. They possess a plurality of

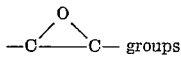 groups which, as indicated above, are surprisingly inert to polymerization in that they do not set up to solid resins when treated with materials such as amines. Instead, the polymerizing agents merely add to the epoxy group to form new derivatives. Polyfunctional amines, for example, add to the epoxy groups to form new hydroxy amino esters. Amines that may be reacted with the epoxy esters to form new hydroxy amino esters includes those having a

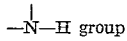 group such as, for example, by octyl amine, ethylene diamine, butylene diamine, benzylamine, diethylamine, phenylene diamine, hexamethylene diamine, and the like. Polymeric polyamines are particularly useful as they react with the epoxy esters to give higher molecular weight products.

The reaction may be carried out in the presence or absence of solvents or diluents. Suitable solvents that may be employed include, among others, benzene, xylene, toluene, cyclohexanone, and the like, and mixtures thereof.

The amount of the amine added to the novel epoxy esters of the invention to form the new hydroxy amino esters will vary depending upon the type of product desired. If all of the epoxy groups are to be converted to

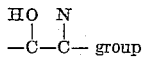 group the epoxy ester should be reacted with at least a chemical equivalent amount of the amine, i. e., with an amount of amine needed to furnish one —NH group for every epoxy group. On the other hand, if only a portion of the epoxy groups are to be converted to

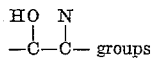 groups so as to form hydroxy amino epoxy esters, the epoxy esters should be reacted with only that amount of the amine which will react with a portion of the epoxy groups. For example, if one desires to form a hydroxy amino epoxy ester from epoxidized dicrotyl adipate and ethylene diamine, one should react one mole of the ester with one mole of the ethylene diamine.

Temperatures employed during the formation of the hydroxy amino esters will vary depending upon the reactants. In most cases, the temperatures varying from about 50° C. to 150° C. will be sufficient with more preferred temperatures ranging from about 60° C. to 100° C.

When the reaction is complete, the hydroxy amino esters may be recovered by any suitable means, such as fractional distillation, fractional crystallization, filtration and the like, depending upon the nature of the resulting hydroxy amino ester.

As indicated above, the hydroxy amino esters formed by the above process are particularly valuable in that they may be reacted with polycarboxylic acids to form long chain polyesters or polyesteramides useful in the formation of fibers, filaments and surface coatings. The polyepoxy polyester-polyamides formed from polycarboxylic acids and the above-described partial hydroxy amino esters formed by reacting only a portion of the epoxy groups with a polyfunctional amine are particularly valuable in that they form polyester-polyamide fibers which are more easily dyed than many of the other similar fibers.

The novel epoxy esters of the invention also have improved compatibility with various synthetic oils and resins and act in combination therewith to plasticize the material and form compositions having good flexibility and strength over a wide range of temperature.

The preferred materials to be plasticized with the epoxy esters of the invention include the vinyl-type polymers, i. e., polymers of monomers having a $CH_2=C=$ group, such as, for example, vinyl chloride, vinylidene chloride, acronitrile, methacrylonitrile, methyl methacrylate, vinyl pyridine, styrene, alpha-methylstyrene, vinyl acetate, vinyl butyrate, vinyl benzoate, vinyl ketone and the like.

The epoxy esters, due to relative inertness of epoxy groups, are particularly valuable as plasticizing agents for polymers containing nitrogen, such as polymers of the vinyl pyridines, as well as polymers containing halogen, such as vinyl chloride, as they undergo less reaction with the polymer and thereby retain the flexibility over a longer period of time.

The novel esters may be used as plasticizers by themselves or may be used in combination with other plasticizing agents, such as dioctyl phthalate, tricresyl phosphate, dibutyl phthalate and the like.

The amount of the esters to be incorporated with the above materials may vary over a wide range depending upon the particular type of polymer, intended use of the product, etc. In most cases, the amount of the plasticizer will vary from about 20 to 150 parts by weight per 100 parts of resin.

The epoxy esters and the material to be plasticized may be compounded by means of conventional equipment such as mills of the heated roll type or internal mixers. The plasticizer and other compounding ingredients, such as fillers, pigments and the like, are worked in the polymer so that they are thoroughly dispersed therein by means of such equipment and the resultant composition then molded, calendered, extruded or otherwise formed into articles of the desired shape by conventional procedure.

The novel epoxy esters may also be used as stabilizing agents for organic materials containing acid-forming elements, such as halogen atoms, sulfate, phosphate and nitrate radicals, and, because of the relative inert nature of the epoxy group, show the stabilizing agent over a much longer period of time than is generally possible with many of the other types of epoxy materials.

Examples of materials that may be stabilized with the novel esters of the invention include, among others, halogenated products of fats, train oils, waxes, polymers of halogenated monomers, polymers of monomers containing sulfate, nitrate and phosphate radicals, after halogenated polymers of the various monomers, halogenated rubber, polymers and copolymers of dienes with sulfur dioxide, nitrogen trioxide, and the like.

In most cases, the esters are effective as stabilizers in amounts varying from about .1% to about 20% by weight of the material being stabilized, but larger or smaller amounts may be employed as desired or necessary. If other stabilizers are employed in combination with the novel esters, the esters may generally be employed in smaller amounts, such as from about .01% to 10% by weight of the material being stabilized.

The esters may be incorporated into the material being stabilized by any suitable method. They may be added in a dissolved, suspended or pulverant state to the desired material which in turn may be in a dissolved, dispersed or solid stage. In some cases, it may be possible to introduce the novel esters in the reaction mixture during the formation of the material to be stabilized. In most cases, however, it will probably be more desirable to add the ester by merely mixing the material and ester in a masticator or on heated differential rolls.

As noted above, the novel esters also act as plasticizing agent for many of these materials so that they may act in a combined status as stabilizer-plasticizer. In this case, the esters will be added in amounts and in the manner described hereinabove for the use of the esters as plasticizers and in that case the resulting composition will display the desired improvement in flexibility as well as increased resistance to heat and light.

While the polyfunctional epoxy esters of the invention show unexpected inertness in the above-described applications, they demonstrated surprisingly high activity when contacted with amine-anhydride combinations and may be cured therewith to form hard polymers suitable for use in castings and pottings. Anhydrides that may be used for this purpose include, among others, succinic anhydride, maleic anhydride, phthalic anhydride, anhydrides formed by the Diels Alder reaction between conjugated ethylenic compounds and maleic anhydride, and the like. The amines used for the purpose may be any of those described above for use in preparing the hydroxy amino esters.

To illustrate the manner in which the invention may be carried out, the following examples are given. It is to be understood, however, that the examples are for the purpose of illustration and the invention is not to be regarded as limited to any of the specific materials or conditions recited therein.

*Example I*

This example illustrates the preparation and properties of epoxidized dicrotyl oxalate, i. e., di(2,3-epoxybutyl) oxalate.

435.6 parts of dicrotyl oxalate (prepared as shown above) was added to 500 parts of chloroform. 743 parts of a 45% peracetic acid solution was then added to the mixture and the resulting mixture allowed to stand at room temperature for 2 days. The mixture was then washed with ice water, cold 20% sodium hydroxide, ice water and then filtered through sodium sulfate. Chloroform was then taken off and the product concentrated to a white solid identified as di(2,3-epoxybutyl) oxalate.

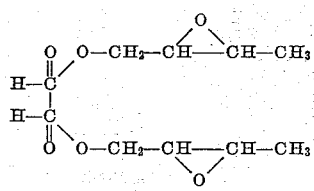

M. P. 102–106° C. C—found 52.2, theory 52.1; H—found 6.1, theory 6.1: epoxy value found 0.85 eq./100 g., theory 0.87 eq./100 g.

The di(2,3-epoxybutyl) oxalate produced by the above process was then combined with an equal portion of ethylene diamine and 100 parts of benzene and the mixture heated to 65° C. for 10 hours. A reaction occurred but there was no indication of polymerization. The mixture was then distilled to yield a dihydro diamino ester which could be polymerized by addition of succinic acid.

The above result was quite unexpected in view of the fact that when diglycidyl oxalate, i. e., di(2,3-epoxypropyl) oxalate, is heated with an equal portion of ethylene diamine, the mixture sets up to a hard casting indicating there was extensive polymerization through the epoxy groups.

*Example II*

This example illustrates the preparation and properties of epoxidized dicrotyl adipate, i. e., di(2,3-epoxybutyl) adipate.

252 parts of dicrotyl adipate (prepared as shown above) was added to 500 parts of chloroform. 375 parts of a 45% peracetic acid solution was then added to the mixture and the resulting mixture allowed to stand at 0° C. to 25° C. for 24 hours. The product was then washed with ice water, cold 20% sodium hydroxide, ice water and then filtered through sodium sulfate. Chloroform was then taken off and the product concentrated to a viscous liquid identified as di(2,3-epoxybutyl) adipate.

$$CH_3-CH\overset{O}{\diagup\diagdown}CH-CH_2-O-\overset{O}{\overset{\|}{C}}-(CH_2)_4\overset{O}{\overset{\|}{C}}-O-CH_2-CH\overset{O}{\diagup\diagdown}CH-CH_3$$

B. P. 170–174° C. at 0.15 mm., refractive index $N_D^{20}$ 1.4605. C—found 60.0, theory 58.7; H—found 7.9, theory 7.7.

The di(2,3-epoxybutyl) adipate produced by the above process was then combined with an equal portion of diethylamine and 100 parts of benzene and the mixture heated to 65° C. for 10 hours. A reaction occurred but there was no indication of polymerization. The mixture was then distilled to yield a dihydroxy diamino ester which can be polymerized by addition of succinic acid.

The above result was quite unexpected in view of the fact that when diglycidyl adipate, i. e., di(2,3-epoxypropyl) adipate is heated with an equal portion of diethylamine, the mixture sets up to a hard casting indicating that there was extensive polymerization through the epoxy groups.

*Example III*

This example illustrates the preparation and properties of epoxidized dicrotyl maleate, i. e., di(2,3-epoxybutyl) maleate.

222 parts of dicrotyl maleate (prepared by reacting maleic anhydride with crotyl alcohol) was added to 500 parts of chloroform. 375 parts of a 45% peracetic acid solution was then added to the mixture and the resulting mixture allowed to stand at 0° C. to 10° C. for several days. The product was then washed with ice water, cold 20% sodium hydroxide, ice water and then filtered through sodium sulfate. Chloroform was then taken off and the product concentrated to a viscous liquid identified as di(2,3-epoxybutyl) maleate.

$$CH_3-CH\overset{O}{\diagup\diagdown}H_2C-HC-\overset{O}{\overset{\|}{C}}-\overset{H}{\overset{|}{C}}=\overset{H}{\overset{|}{C}}-\overset{O}{\overset{\|}{C}}-O-CH_2-CH\overset{O}{\diagup\diagdown}CH-CH_3$$

The di(2,3-epoxybutyl) adipate produced above was then combined with an equal portion of diethylamine and the mixture heated to 65° C. for several hours. Reaction occurred but no indication of polymerization. The mixture was then distilled to yield a hydroxy amino ester.

The above result was quite unexpected in view of the fact that when diglycidyl maleate is heated with an equal portion of diethylamine, the mixture sets up to a hard casting indicating there was extensive polymerization through the epoxy groups.

*Example IV*

This example illustrates the preparation and properties di(2,3-epoxybutyl) sebacate.

308 parts of dicrotyl sebacate (produced by reaction of sebacic acid with crotyl alcohol) was added to 500 parts of chloroform. 375 parts of a 45% peracetic acid solution was then added to the mixture and the resulting mixture allowed to stand at 0° C. to 25° C. for 24 hours. The product was then washed with ice water, cold 20% sodium hydroxide, ice water and then filtered through sodium sulfate. Chloroform was then taken off and the product concentrated to a solid identified as di(2,3-epoxybutyl) sebacate.

$$CH_3-CH\overset{O}{\diagup\diagdown}CH-CH_2-O-\overset{O}{\overset{\|}{C}}-(CH_2)_8\overset{O}{\overset{\|}{C}}-O-CH_2-CH\overset{O}{\diagup\diagdown}CH-CH_3$$

The di(2,3-epoxybutyl) sebacate produced by the above process was then combined with an equal portion of ethylene diamine and the mixture heated to 65° C. for several hours. Reaction occurred but no indication of polymerization. The mixture is then distilled to yield a hydroxy amino ester.

*Example V*

This example illustrates the preparation and properties of di(9,10-epoxytetradecyl) succinate.

Parts of di(9-tetradecenyl) succinate (produced by reacting 9-tetradecenol with succinic anhydride) was added to 500 parts of chloroform. 375 parts of a 45% peracetic acid solution was then added to the mixture and the resulting mixture allowed to stand at 0° C. to 25° C. for two days. The product is then washed as shown in Example II and the chloroform taken off to yield a soft solid identified as di(9,10-epoxytetradecyl) succinate.

The di(9,10 - epoxytetradecyl) succinate produced above is then combined with an equal portion of ethylene diamine and the mixture heated to 65° C. There was no indication of polymerization. The mixture was then distilled to yield a hydroxy amino ester.

*Example VI*

50 parts of di(2,3-epoxybutyl) adipate produced as shown in Example II was combined with 50 parts of succinic anhydride and 10 parts of diethylamine and the mixture heated to 80° C. In a short period, the mixture sets up to a hard solid casting.

*Example VII*

About 100 parts of polyvinyl chloride is combined with 50 parts of di(2,3-epoxybutyl) adipate as produced in Example II and the mixture milled on a roll mill at a temperature of about 120° C. for three minutes and then molded at 175° C. The resulting composition is a homogeneous sheet having good flexibility and strength and exceptionally good stability to discoloration by heat and light. The inactivity of the epoxy ester is shown by the fact that the above stability to heat and light is still shown many months after the plasticized sheet has been prepared.

*Example VIII*

This example illustrates the preparation and properties of di(2,3-epoxybutyl) 1,4-cyclohexanedicarboxylate.

280 parts of dicrotyl 1,4-cyclohexanedicarboxylate is added to 500 parts of chloroform. 340 parts of a 45% peracetic acid solution is then added to the mixture and the resulting mixture allowed to stand at 0° C. to 25° C. for two days. The product is then washed as shown in Example II and the chloroform taken off to yield di(2,3-epoxybutyl) 1,4-cyclohexanedicarboxylate.

The diepoxy ester produced above can be reacted with ethylene diamine to produce a hydroxy amino ester which is useful in the preparation of polyester-amides.

*Example IX*

274 parts of dicrotyl phthalate is added to 500 parts of chloroform. 340 parts of a 45% peracetic acid solution is then added to the mixture and the resulting mixture allowed to stand at 0° C. to 25° C. The product is then washed as shown in Example II and the chloroform taken off to yield di(2,3-epoxybutyl) phthalate.

50 parts of the di(2,3-epoxybutyl) phthalate produced as shown above is combined with 50 parts of succinic anhydride and 10 parts of diethylamine and the mixture heated to 80° C. In a short period, the mixture sets up to a hard casting.

Epoxy ester having related properties may be obtained by replacing the dicrotyl phthalate in the above preparation process with equivalent amounts of each of the following: dicrotyl terephthalate, dicrotyl isophthalate and dicrotyl 3-methyl phthalate.

We claim as our invention:

1. Esters of epoxy-substituted hydrocarbon alcohols having at least one

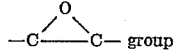

in an internal open-chain portion of the molecule and containing no more than 20 carbon atoms and polycarboxylic acids of the group consisting of unsubstituted mononuclear carbocyclic hydrocarbon dicarboxylic acids containing no more than 15 carbon atoms and unsubstituted acyclic hydrocarbon dicarboxylic acids containing no more than 20 carbon atoms, the said

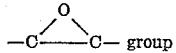

remaining intact in the ester molecule.

2. An ester of an epoxy-substituted hydrocarbon monohydric alcohol containing no more than 20 carbon atoms and containing at least one

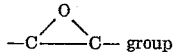

in an internal open-chain portion of the molecule and an unsubstituted mononuclear carboxylic hydrocarbon dicarboxylic acid containing no more than 15 carbon atoms.

3. An unsubstituted epoxy ester as defined in claim 2 wherein the epoxy alcohol is an epoxyalkanol wherein the internal epoxy group is not more than 12 carbon atoms removed from the OH group.

4. An ester of (*a*) an epoxy-substituted hydrocarbon monohydric alcohol containing no more than 20 carbon atoms and containing at least one

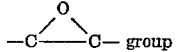

in an internal open-chain portion of the molecule and (*b*) an unsubstituted aliphatic acyclic hydrocarbon dicarboxylic acid containing no more than 20 carbon atoms.

5. An ester of (*a*) an epoxy-substituted hydrocarbon monohydric alcohol containing no more than 20 carbon atoms and containing at least one

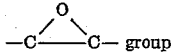

in an internal open-chain portion of the molecule and (*b*) an unsubstituted alkanedioic acid containing no more than 12 carbon atoms.

6. An epoxy ester as defined in claim 2 wherein the epoxy alcohol is epoxidized crotyl alcohol.

7. An unsubstituted ester of an epoxyalkanol containing no more than 18 carbon atoms wherein the epoxy group is an internal open-chain portion of the molecule not more than 12 carbon atoms removed from the OH group, and an aliphatic unsubstituted acyclic hydrocarbon dicarboxylic acid containing no more than 20 carbon atoms.

8. An ester of epoxidized crotyl alcohol and an aliphatic unsubstituted acyclic hydrocarbon dicarboxylic acid containing no more than 20 carbon atoms.

9. An unsubstituted di(2,3-epoxybutyl) alkanedioate wherein the alkanedioate portion of the ester molecule contains no more than 20 carbon atoms.

10. Di(2,3-epoxybutyl) adipate.
11. Di(2,3-epoxybutyl) oxalate.
12. Di(2,3-epoxybutyl) maleate.
13. Di(9,10-epoxytetradecyl) succinate.

References Cited in the file of this patent
UNITED STATES PATENTS
2,524,432    Darough _____ Oct. 3, 1950
OTHER REFERENCES
Kester: J. Org. Chem. 8: 550–56 (1948).